US009577945B2

(12) United States Patent
Araújo et al.

(10) Patent No.: US 9,577,945 B2
(45) Date of Patent: *Feb. 21, 2017

(54) DATA STREAMING SCHEDULER FOR DUAL CHIPSET ARCHITECTURES THAT INCLUDES A HIGH PERFORMANCE CHIPSET AND A LOW PERFORMANCE CHIPSET

(71) Applicant: International Business Machines Corporation, Armonk, NY (US)

(72) Inventors: Murilo Opsfelder Araújo, Limeira (BR); Rafael Camarda Silva Folco, Santa Bárbara d'Oeste (BR); Breno Henrique Leitão, Jd Guanabara Campinas (BR); Tiago Nunes dos Santos, Araraquara (BR)

(73) Assignee: International Business Machines Corporation, Armonk, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/484,725

(22) Filed: Sep. 12, 2014

(65) Prior Publication Data

US 2015/0288608 A1 Oct. 8, 2015

Related U.S. Application Data

(63) Continuation of application No. 14/245,604, filed on Apr. 4, 2014, now Pat. No. 9,419,905.

(51) Int. Cl.
*G01R 31/08* (2006.01)
*H04J 1/16* (2006.01)
(Continued)

(52) U.S. Cl.
CPC ........... *H04L 47/245* (2013.01); *G06F 1/3293* (2013.01); *H04L 47/27* (2013.01); *H04L 47/29* (2013.01)

(58) Field of Classification Search
CPC .................................................... G06F 1/3293
See application file for complete search history.

(56) References Cited

U.S. PATENT DOCUMENTS 6,768,716 B1 * 7/2004 Abel ........................ G06F 9/50
370/230
8,447,803 B2 5/2013 Boucher et al.
(Continued)

FOREIGN PATENT DOCUMENTS

WO 2005062180 7/2005
WO 2009029643 3/2009
(Continued)

OTHER PUBLICATIONS

Office Action dated Sep. 29, 2015, received in U.S. Appl. No. 14/245,604.
(Continued)

*Primary Examiner* — Maharishi Khirodhar
(74) *Attorney, Agent, or Firm* — Scully, Scott, Murphy & Presser, P.C.

(57) ABSTRACT

A dual chipset architecture, a method of operating a scheduler for a dual chipset architecture, and a computer program product for operating a scheduler for a dual chipset architecture. In an embodiment, the dual chipset architecture comprises a high performance processor, a low performance processor, and a scheduler for the processors. The scheduler is provided for determining an expected data traffic flow to the chipset, and for selectively enabling the high and low performance processors, based on this expected data flow, ahead of this expected data flow reaching the chipset. In one embodiment, a specified data traffic indicator is associated with the expected data traffic flow, and the scheduler uses this specified data traffic indicator to determine the expected data traffic flow. In an embodiment, this specified data traffic
(Continued)

indicator is a value for a defined window size for the expected data flow.

4 Claims, 6 Drawing Sheets

(51) Int. Cl.
  *H04L 1/00* (2006.01)
  *H04L 12/851* (2013.01)
  *G06F 1/32* (2006.01)
  *H04L 12/801* (2013.01)
  *H04L 12/807* (2013.01)

(56) References Cited

U.S. PATENT DOCUMENTS

| | | | |
|---|---|---|---|
| 2007/0198981 A1* | 8/2007 | Jacobs | G06F 1/3203 718/102 |
| 2008/0120426 A1* | 5/2008 | Balakrishnan | H04L 69/163 709/230 |
| 2010/0115307 A1 | 5/2010 | Diab | |
| 2015/0146740 A1* | 5/2015 | Yasuda et al. | 370/419 |
| 2015/0154141 A1* | 6/2015 | Folco et al. | 370/419 |

FOREIGN PATENT DOCUMENTS

| | | |
|---|---|---|
| WO | 2011107777 | 9/2011 |
| WO | 2013095664 | 6/2013 |

OTHER PUBLICATIONS

Van Craeynest, K. et al., "Scheduling Heterogeneous Multi-Cores through Performance Impact Estimation (PIE)" 39th Annual International Symposium on Computer Architecture (ISCA) (Jun. 9-13, 2012) pp. 213-224.

Yu, Z., "Towards High-Performance and Energy-Efficient Multi-core Processors" Analog Circuits and Signal Processing, Chapter 2 (2010) pp. 29-51, vol. 382.

Yang, C.C. et al., "Adaptive Power Saving Strategy Based on Traffic Load in the IEEE 802.16e Network" Proceedings, International Conference on Information and Communication Technologies (ICICT 2010) (May 26-28, 2010), Tokyo, Japan, 5 pages.

U.S. Appl. No. 14/096,270, filed Dec. 4, 2013.

Office Action dated Feb. 22, 2016, received in U.S. Appl. No. 14/245,604.

List of IBM Patents or Patent Applications Treated as Related.

* cited by examiner

| ACTIONS | | |
|---|---|---|
| FLOW PREDICTION | LIMITS | ACTION |
| UP | CROSSED HARD LIMIT | SWITCH TO BIG |
| DOWN | CROSSED SOFT LIMIT | SWITCH TO OVERCLOCKED LITTLE AND TRIGGER THE TIMER |

| GRAYZONE TIMER TIMES OUT | |
|---|---|
| LIMITS | ACTION |
| STAY IN THE GRAY ZONE | SWITCH TO BIG |
| CROSSED THE HARD LIMIT | SWITCH TO NORMAL LITTLE |

DATA STREAMING SCHEDULER FOR DUAL CHIPSET ARCHITECTURES THAT INCLUDES A HIGH PERFORMANCE CHIPSET AND A LOW PERFORMANCE CHIPSET

CROSS REFERENCE TO RELATED APPLICATION

This application is a continuation of co-pending patent application Ser. No. 14/245,604, filed Apr. 4, 2014, the disclosure of which is hereby incorporated herein by reference in its entirety.

BACKGROUND

The present invention relates to data processing, and more specifically, to methods, apparatus, and products for data streaming scheduling for dual chipset architectures that includes a high performance chipset and a low performance chipset.

Dual chipset architectures, sometimes referred to as big. LITTLE architectures, have both a high performance chipset and a low performance chipset. These architectures provide both high performance combined with extreme power efficiency to minimize energy consumption. The architecture comprehends the use of a powerful processor for the high peak use with a minimalist processor for times having low levels of data processing.

For example, modern computing systems utilize communications adapters, in the form of an expansion card or an on-board adapter, to communicate with other computers via a data communications network. Such communications adapters may be capable of sending and receiving data at extremely high rates. Such communications adapters can also consume significant amounts of power to support high data exchange rates, even when the communications adapters are sending and receiving data at rates that are well below their capabilities.

SUMMARY

Embodiments of the invention provide a dual chipset architecture, a method of operating a scheduler for a dual chipset architecture, and a computer program product for operating a scheduler for a dual chipset architecture.

In an embodiment, the dual chipset architecture comprises a high performance processor, a low performance processor, and a scheduler for the high and low performance processors. The scheduler is provided for determining an expected data traffic flow to the chipset, and for selectively enabling the high and low performance processors, based on said expected data flow, ahead of said expected data flow reaching the chipset.

In one embodiment, a specified data traffic indicator is associated with the expected data traffic flow, and the scheduler uses this specified data traffic indicator to determine the expected data traffic flow.

In an embodiment, this specified data traffic indicator is a value for a defined window size for the expected data flow.

In one embodiment, the expected data traffic flow includes a plurality of data flows through a specified connection, and a respective one data flow indicator value is associated with each of these plurality of data flows. Each of the data flow indicator values indicates an expected volume of data in the associated data flow, and the specified data traffic flow indicator is based on the data flow indicator values.

In an embodiment, the specified data traffic flow indicator is a sum of the data flow indicator values.

In one embodiment, the scheduler includes control logic for enabling the high performance processor when the expected data traffic flow is above a first threshold, and for enabling the low performance processor when the expected data traffic flow is below a second threshold, lower than the first threshold. This control logic is also for enabling the high performance processor and the low performance processor when the expected data flow is between the first and second thresholds.

In an embodiment, the scheduler includes control logic for disabling the low performance processor when the expected data flow remains between the first and second thresholds for a predetermined length of time.

In one embodiment, this predetermined length of time starts when the expected data traffic flow decreases below the first threshold.

In an embodiment, the scheduler includes control logic for disabling the high performance processor when the expected data flow decreases below the second threshold, and for disabling the low performance processor when the expected data flow increases above the first threshold.

In an embodiment, the scheduler includes control logic for analyzing incoming traffic to identify a defined window size for each segment of the analyzed incoming traffic, and summing all the window sizes identified over a predetermined time period to obtain a window size sum. This control logic is also for determining whether the window size sum meets a first threshold value representative of a high traffic volume, for determining whether the window size sum does not meet a second threshold value, less than the first threshold value, representative of a low traffic volume, and for determining whether the window size sum is between the first and second threshold values representative of an intermediate traffic volume. This control logic, responsive to the determination the window size sum meeting the first threshold, enables a first set of processors, including the first processor, to process said high traffic volume; and responsive to the determination the window size sum does not meet the second threshold value, enables a second set of processor, including the second processor, to process said low traffic volume. In addition, this control logic, responsive to the determination the window size sum is between the first and second threshold values, enables the first and second sets of processors to process said intermediate traffic volume, and starts a timer for a predetermined time period, said second set of processors being enabled in an overclock mode. Responsive to determining, when of the predetermined time period expires, the window size sum is above the second threshold value, the control logic disables the overclock mode of the second set of processors.

Embodiments of the invention may result in a number of benefits including increased power savings, predictable actions, and increased efficiency on traffic off-load.

When traffic is low or a network is idle, the scheduler can disable the high performance processor and let just the low performance processor enabled. There is no need to have the high performance processor consuming energy if the low performance processor can handle the workload smoothly. On the other hand, when traffic increases, the data is processed by the high performance processor.

Enabling the high performance processor in advance of a high workload can help avoid slow or undesirable performance on the network. As discussed in detail below, this can be done by analyzing TCP window size. In addition, the scheduler enables the high performance and energy efficient processors to work at optimal capacity and to switch between the processors more efficiently.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION

Figure 1:
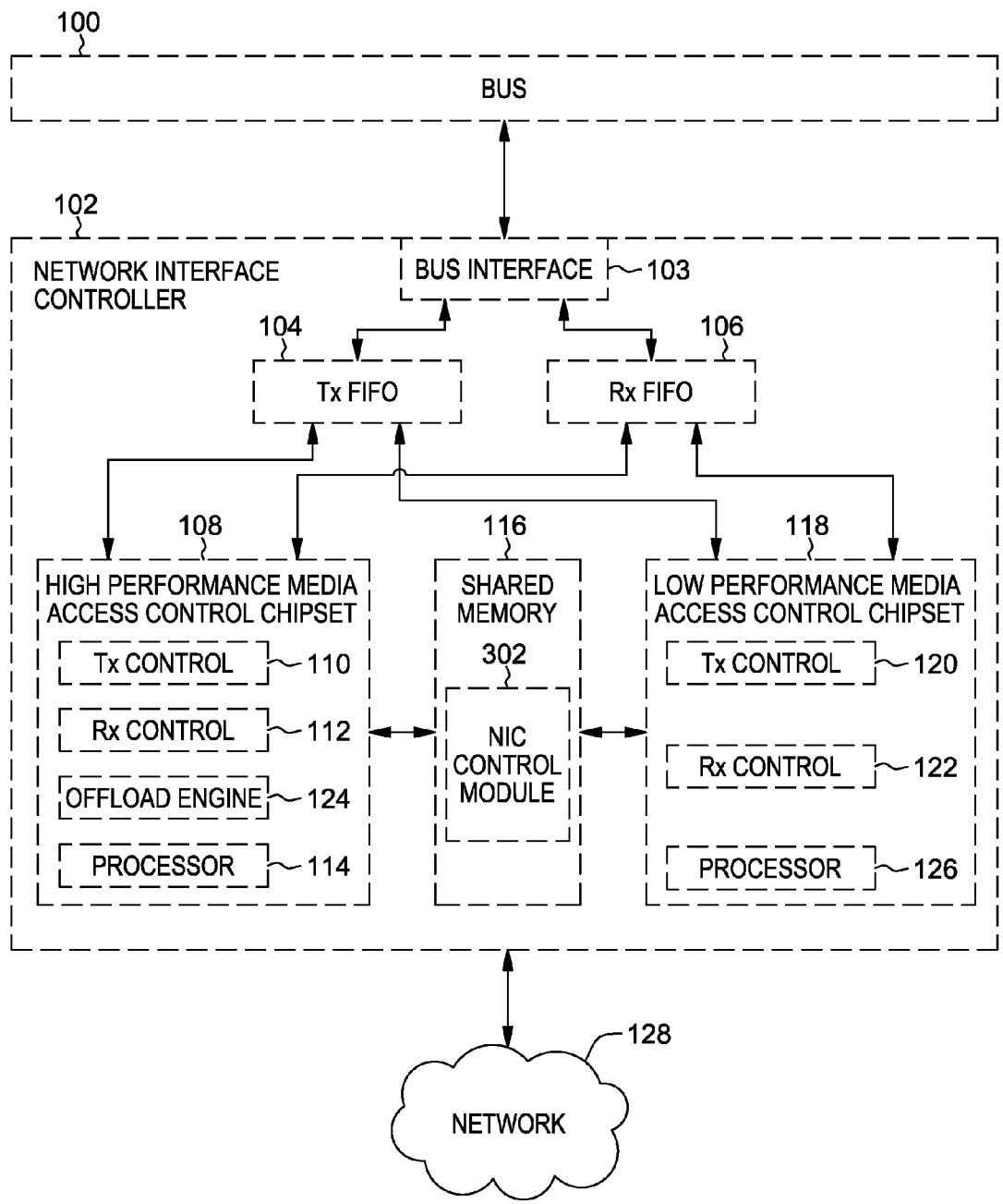
FIG. 1 sets forth a block diagram of a dual chipset of a network interface controller (NIC) according to embodiments of the present invention.

Example methods, apparatuses, and products for operating a dual chipset NIC that includes a high performance media access control chipset and a low performance media access control chipset in accordance with the present invention are described with reference to the accompanying drawings, beginning with FIG. 1. FIG. 1 sets forth a block diagram of a dual chipset NIC 102 according to embodiments of the present invention. The NIC 102 of FIG. 1 represents a computer hardware component that connects a computer to a computer network. The NIC 102 of FIG. 1 may reside within a personal computer, a blade server in a data center, a standalone server, or in other computing systems. The NIC 102 of FIG. 1 may be embodied as an expansion card that is coupled for data communications with a computer bus (100) via a bus interface 103. Alternatively, the NIC 102 may be built into a motherboard of a computer and coupled for data communications with a computer bus 100 that also resides on the motherboard. In the example of FIG. 1, the NIC 102 may be implemented to enable a computer to communicate with a computer network 128 over many different data communications protocols, such that the NIC 102 may be embodied as an Ethernet adapter, a Fibre Channel adapter, a Fibre Channel over Ethernet adapter, and so on.

The NIC 102 of FIG. 1 includes a Transfer ('Tx') FIFO 104 and a Receive ('Rx') FIFO 106. In the example of FIG. 1, the Tx FIFO 104 may include computer memory for storing packets to be transferred from the NIC 102 via the bus interface 103 and bus 100 to other components within a computing system, such as a computer processor. In the example of FIG. 1, the Rx FIFO 106 may include computer memory for storing packets received by the NIC 102 from other components within a computing system, such as a computer processor, via the bus interface 103 and bus 100. In such a way the Tx FIFO (104) and Rx FIFO 106 may be used to store data packets being received and transferred by the NIC 102.

The NIC (102) of FIG. 1 includes both a high performance media access control chipset (108) and a low performance media access control chipset (118). In the example of FIG. 1, the high performance media access control chipset (108) and the low performance media access control chipset (118) may be embodied as automated computing machinery, including processing units, circuits, computer memory, and similar computing components configured to perform functions that enable the NIC (102) to carry out data communications with a data communications network (128) over a Media Independent Interface ('MII').

In the example of FIG. 1, the high performance media access control chipset 108 includes a Tx Control module 110 and an Rx Control module 112. The Tx Control module 110 may be embodied, for example, as a circuit configured to load messages and data into the Tx FIFO 104 to be transferred from the NIC 102 via the bus interface 103 and bus 100 to other components within a computing system, such as a computer processor. The Rx Control module 112 may be embodied, for example, as a circuit configured to retrieve and process messages and data from Rx FIFO 106 for subsequent transfer by the NIC 102 to the data communications network 128. In the example of FIG. 1, the low performance media access control chipset 118 includes a similar Tx Control module 120 and an Rx Control module 122.

In the example of FIG. 1, the high performance media access control chipset 108 and the low performance media access control chipset 118 also include a processor 114, 126. In the example of FIG. 1, each processor 114, 126 represents computing machinery for processing computer program instructions. In the example of FIG. 1, the processor 114 in the high performance media access control chipset 108 may operate at a higher clock rate than the processor 126 in the low performance media access control chipset 118, such that the processor 114 in the high performance media access control chipset 108 can execute computer program instructions at a faster rate than the processor 126 in the low performance media access control chipset 118. In such a way, the high performance media access control chipset 108 may provide greater performance than the low performance media access control chipset 118.

The high performance media access control chipset 108 includes an offload engine 124. In the example of FIG. 1, the offload engine 124 may be embodied as automated computing machinery, such as a digital circuit, for processing of an entire protocol stack such that such processing is 'offloaded' from computer processors in a computing system that includes the NIC 102 to the actual NIC 102 itself. For example, the offload engine 124 of FIG. 1 may process the entire TCP/IP stack when the NIC 102 is embodied as an Ethernet adapter. The offload engine 124 may therefore be responsible for carrying out certain functions such as a connection establishment using a 3-way handshake, acknowledgment of received packets, checksum and sequence number calculations, and so on. In such a way, moving some or all of these functions to dedicated hardware such as the offload engine 124 can free a computing system's primary CPU to perform other tasks.

With the embodiment of FIG. 1, the low performance media access control chipset 118 does not include an offload engine. Because the offload engine 124 of the high performance media access control chipset 108 represents additional power consuming computer hardware, the low performance media access control chipset 118 may be utilized during periods of low network bandwidth to reduce the amount of power utilized by the NIC 102. Furthermore, the presence of the offload engine 124 in the high performance media access control chipset 108 may result in improved performance by the high performance media access control chipset (108) relative to the low performance media access control chipset 118.

In the example of FIG. 1, the NIC 102 also includes shared memory 116 that is accessible by the high performance media access control chipset 108 and the low performance media access control chipset 118. The shared memory 116 of FIG. 1 can include, stored within the shared memory 116, control logic for managing the operation of the NIC 102, such as a NIC control module 302. The NIC control module 302 of FIG. 1 may be embodied, for example, as a module of computer program instructions executing on computer hardware such as a computer processor.

The NIC control module 302 of FIG. 1 may include computer program instructions that, when executed, determine an amount of network traffic being processed by the NIC 102. In the example of FIG. 1, determining the amount of network traffic being processed by the NIC 102 can include determining the amount of network traffic being processed by the NIC 102 over a predetermined period time. In the example of FIG. 1, the amount of network traffic being processed by the NIC 102 may be expressed, for example, in terms of the number of bytes processed by the NIC 102 over a particular unit of time. The amount of network traffic being processed by the NIC 102 can include the number of bytes of data received by the NIC 102, the number of bytes of data transferred by the NIC 102, or any combination thereof. In such a way, the amount network traffic being processed by the NIC 102 can represent the total amount of data flowing through the NIC 102 over a particular period of time. Determining an amount of network traffic being processed by the NIC 102 may be carried out, for example, by monitoring the amount of data flowing out of an egress port of the NIC 102 over a predetermined period of time, by monitoring the amount of data flowing into an ingress port of the NIC 102 over a predetermined period of time, or any combination thereof.

Embodiments of the invention provide an efficient scheduler for data streaming to switch between the high performance processor 126 and the power efficient processor 114. Embodiments of the invention use information about incoming data streams to predict the traffic flow, and switch back and forth between the high performance processor and the low performance processor ahead of time based on this prediction, thus improving the power consumption of the architecture. For example, embodiments of the invention may be used with data streams constructed in accordance with the Transmission Control Protocol (TCP). In the TCP, a data stream includes a TCP header that, in turn, includes a field, referred to as window size, and the value in this field is an indication of the amount of traffic in the data stream.

With the TCP protocol, it is easy to determine if a TCP connection will grow—that is, if the amount of data entering through the connection will increase. So, if a connection from one device to another device starts to get busy, then the processing of the data should migrate from the low performance processor to the high performance processor.

In contrast when the connection from one device to another device is not busy, the processing of the data should migrate from the high performance processor to the low performance processor. The high performance processor may be disabled, and the low performance processor is responsible of the connection.

Figure 2:
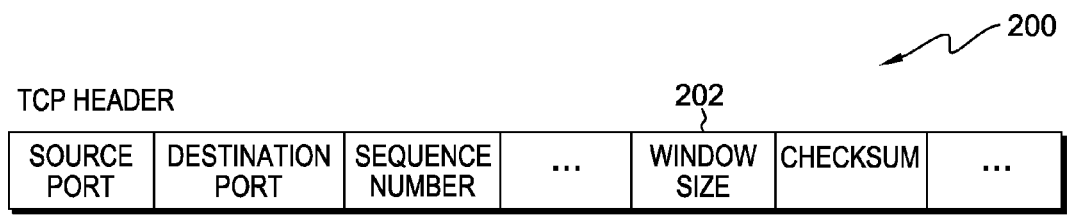
FIG. 2 illustrates the header of a Transmission Control Protocol (TCP) segment that may be used in embodiments of the invention.

TCP provides a feature called Window Scaling, and with reference to FIG. 2, the TCP header 200 has a field named TCP Window Size 202 that is used to control the flow of data and is an indication of the amount of data in the TCP segment.

A TCP window size having a high value indicates that a high traffic volume is coming. When the traffic volume over a connection is very small, the TCP window size has a low value.

In embodiments of the invention, a chipset analyzes all the incoming traffic and monitors the TCP window size for each TCP segment. This chipset is referred to as the Traffic Sensor (TS).

If the TCP window size of a TCP segment is high, this indicates that a high traffic volume is coming, and then the high performance processors are enabled to process the high workload.

If the Traffic Sensor realizes that the TCP window size has decreased too much, or that traffic over a connection is stopped (FYN packet), then the high performance processor is disabled and the low performance processor is enabled to process the low workload.

In embodiments of the invention, the scheduler works by measuring the sum of all TCP window size values at a time interval.

Every TCP segment carries the TCP window size for the corresponding stream of data. A network interface can have plural or multiple streams at the same time.

Examples of data streaming applications include: HTTP and web based applications; Database, Virtualization, Cloud, data center workloads; SSL (Secure Socket Layer); Infrastructure services (LDAP, SSH, Telnet); and Financial Services Applications.

In embodiments of the invention, the scheduler measures the sum of all TCP window size values (Σ) at a time interval (t, t+1, t+2, . . . , t+n). Table 1 below gives an example.

TABLE 1

Measure of TCP window size in time intervals

| Instant t | Instant t + 1 |
|---|---|
| Stream: 1 | Stream: 3 |
| TCP window size: 3 | TCP window size: 7 |
| Stream: 2 | Stream: 4 |
| TCP window size: 4 | TCP window size: 5 |
| Total: 7 | Total: 12 |

In the example of Table 1, in the moment t, the sum of all TCP window size values was 7. In the next moment t+1, the sum was 12.

The TCP window size is a traffic prediction. The TCP segment carries this value to tell the receiver more packets are expected to arrive. A high window size means that a large amount of data is about to be transmitted to the receiver interface.

Thus, if the sum of all window size values is high, it is clear that a high peak of traffic is arriving. So, having the high performance processors enabled in advance will allow the receiver to process all the incoming packets smoothly.

Figure 3:
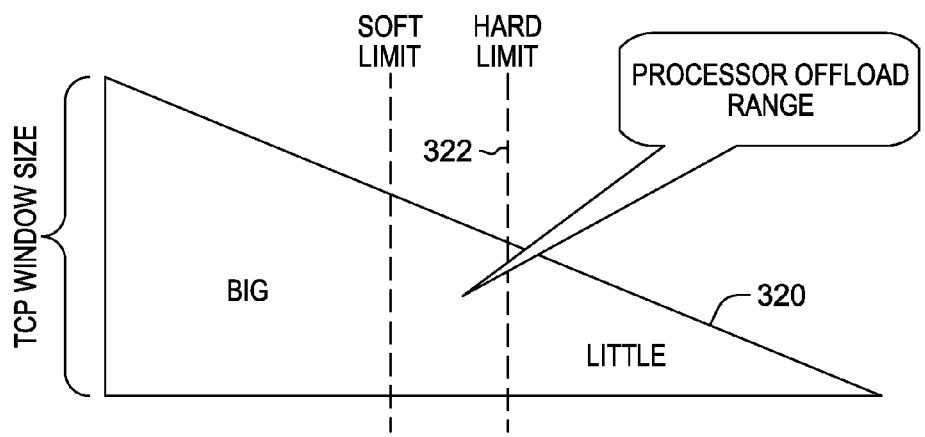
FIG. 3 is an overview of a data streaming scheduler for a dual chipset network in an embodiment of the invention.

FIG. 3 illustrates how the scheduler works. As the above-mentioned sum (Σ) 320 starts to increase and reaches a hard limit 322 (defined in the implementation of the driver), the high performance processor is enabled.

Figure 4:
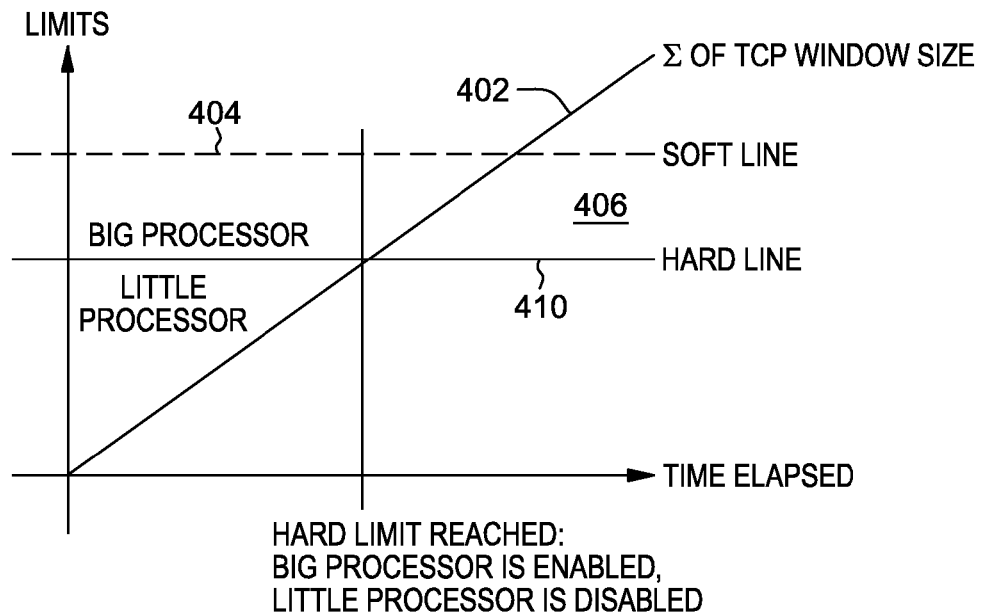
FIG. 4 shows an algorithm that may be used, in embodiments of the invention, for switching between high and low performance processor.

FIG. 4 shows an algorithm for switching between the processors. In this algorithm, if the sum Σ 402 starts to decrease and reaches a soft limit 404 (also defined in the implementation of the driver), a timer (T) is triggered and the low performance processor is enabled in over clock mode (working as its full capacity).

The area 406 between the soft limit 404 and the hard limit 406 is referred to as a grey zone, where both the high performance processor (running at normal speed) and the low performance processor (running overclocked) can handle the traffic with no performance issue.

In an embodiment of the invention, a timer is started when the sum Σ 402 reaches the soft limit. When the timer ends and the sum Σ is still above the hard limit, the high performance processor is enabled again; if the sum Σ is below the hard limit (meaning the traffic prediction has reduced), the over clock mode in the low performance processor is disabled, and this processor is run at its normal speed.

Figure 5:
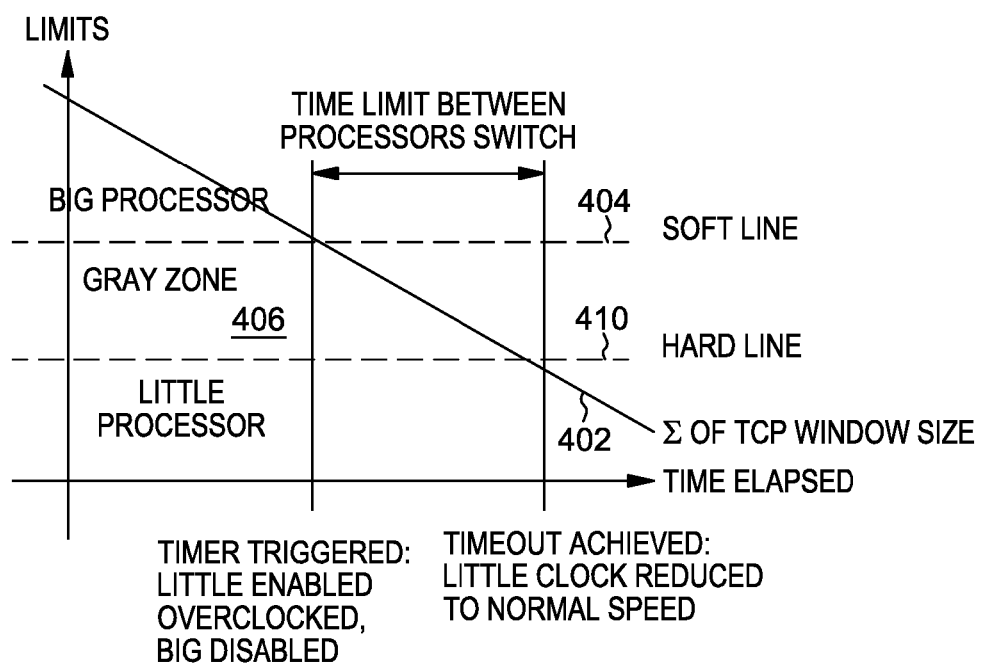
FIG. 5 illustrates an example of switching from a high performance processor to a low performance processor as the predicted amount of data to be processed decreases.

FIG. 5 shows an example when the sum Σ 402 is decreasing until it reaches the grey zone 406. In this example, when Σ is above the soft limit 404, the high performance processor is enabled and handles the data processing load. As Σ falls below the soft limit, the low performance processor is enabled, and the processing load may be shared between the high and the low performance processors. When Σ falls below the hard limit 410, the high performance processor is disabled, and the processing load is handled by the low performance processor.

Figures 6, 7:
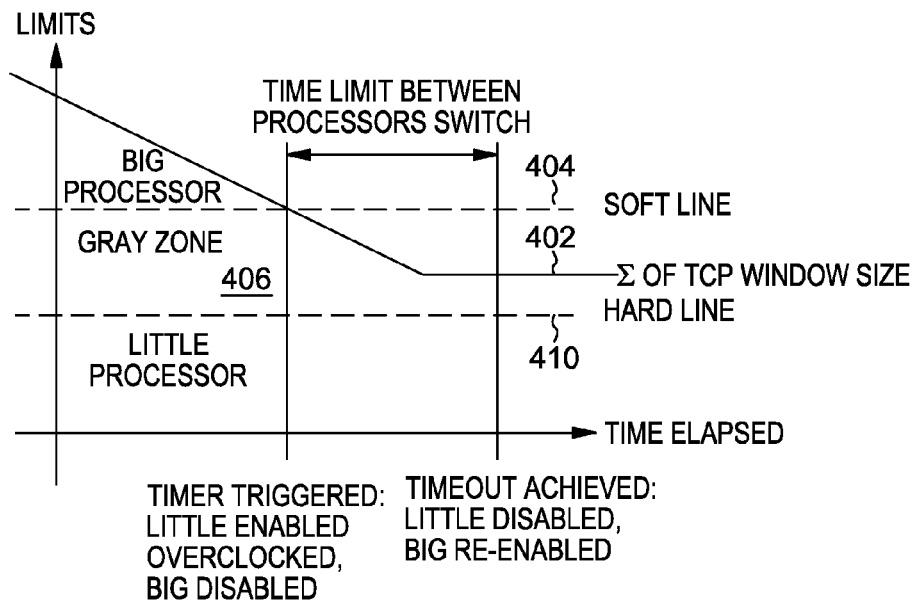
FIG. 6 is another example of an embodiment of the invention when the predicted amount of data to be processed decreases but does not reach a specified lower limit.
FIG. 7 shows two tables that summarize actions taken in embodiments of the invention as the predicted amount of data being processed to be processed changes.

FIG. 6 shows an example of the sum Σ 402 decreasing but the hard limit 410 not being reached, so the processor that will continue to be handling the flow is the high performance processor. In this example when Σ is above the soft limit 404, the high performance processor is enabled to handle the processing load. When Σ reaches the soft limit 404, the low performance processor is enabled, the high performance processor is disabled, and the processing load is handled by the low performance processor.

In this example, after Σ falls below the soft limit, a time out occurs with Σ still above the hard limit 410. When this timeout occurs, the low performance processor is disabled and the high performance processor is re-enabled, and the processing load is handled by the high performance processor.

The tables of FIG. 7 provide a summary of these actions.

With reference again to FIG. 1, the NIC control module 302 of FIG. 1 may also include computer program instructions that, when executed, determine whether the amount of network traffic expected to be processed by the NIC 102 is above, below, or between the above-mentioned soft and hard limits. For example, when the amount of network traffic that is expected to be processed by the NIC 102 is lower than the hard limit, data communications operations should be carried out using the low performance media access control chipset 118. Alternatively, when the amount of network traffic that is to be processed by the NIC 102 is greater than the soft limit, data communications operations should be carried out using the high performance media access control chipset 108.

The NIC control module 302 of FIG. 1 may also include computer program instructions that, when executed, configures the NIC 102 to utilize the high performance media access control chipset 108 for data communications operations. Configuring the NIC 102 to utilize the high performance media access control chipset 108 for data communications operations can include powering down the low performance media access control chipset 118. Configuring the NIC 102 to utilize the high performance media access control chipset (108) for data communications operations is carried out in response to affirmatively determining that the amount of network traffic being processed by the NIC (102) exceeds the predetermined threshold.

Configuring the NIC 102 to utilize the high performance media access control chipset 108) for data communications operations may be carried out, for example, through the use of an active flag maintained by each media access control chipset in shared memory 116. When the value of the active flag maintained by a particular media access control chipset is set to '1', the media access control chipset may operate as normal—sending packets and processing received packets. When the value of the active flag maintained by a particular media access control chipset is set to '0', however, the media access control chipset may operate in a standby mode and may be configured to refrain from processing received packets, transmitting packets, or performing any other operations in an attempt to facilitate data communications. In such an example, configuring the NIC 102 to utilize the high performance media access control chipset 108 for data communications operations may be carried out by setting the active flag for the high performance media access control chipset (108) to a value of '1' and also setting the active flag for the low performance media access control chipset 118 to a value of '0'.

The NIC control module 302 of FIG. 1 may also include computer program instructions that, when executed, configures the NIC 102 to utilize the low performance media access control chipset 118 for data communications operations. Configuring the NIC 102 to utilize the low performance media access control chipset 118 for data communications operations can include powering down the high performance media access control chipset 108. Configuring the NIC 102 to utilize the low performance media access control chipset 118 for data communications operations is carried out in response to determining that the amount of network traffic being processed by the NIC 102 does not exceed the predetermined threshold.

Configuring the NIC 102 to utilize the low performance media access control chipset 118 for data communications operations may be carried out, for example, through the use of an active flag maintained by each media access control chipset in shared memory 116. When the value of the active flag maintained by a particular media access control chipset is set to '1', the media access control chipset may operate as normal—sending packets and processing received packets. When the value of the active flag maintained by a particular media access control chipset is set to '0', however, the media access control chipset may operate in a standby mode and may be configured to refrain from processing received packets, transmitting packets, or performing any other operations in an attempt to facilitate data communications. In such an example, configuring the NIC 102 to utilize the low performance media access control chipset 118 for data communications operations may be carried out by setting the active flag for the low performance media access control chipset 118 to a value of '1' and also setting the active flag for the high performance media access control chipset (108) to a value of '0'.

The NIC control module 302 of FIG. 1 may also include computer program instructions that, when executed during initial power up of the NIC 102, configure the NIC 102 to utilize the low performance media access control chipset 118 for data communications operations. The NIC 102 of FIG. 1 may initially be configured to utilize the low performance media access control chipset 118 for data communications operations in order to conserve power when the NIC 102 is initially powered up. As the amount of network traffic processed by the NIC 102 increases, however, the NIC may eventually switch modes such that the high performance media access control chipset (108) is utilized for data communications operations.

Figure 8:
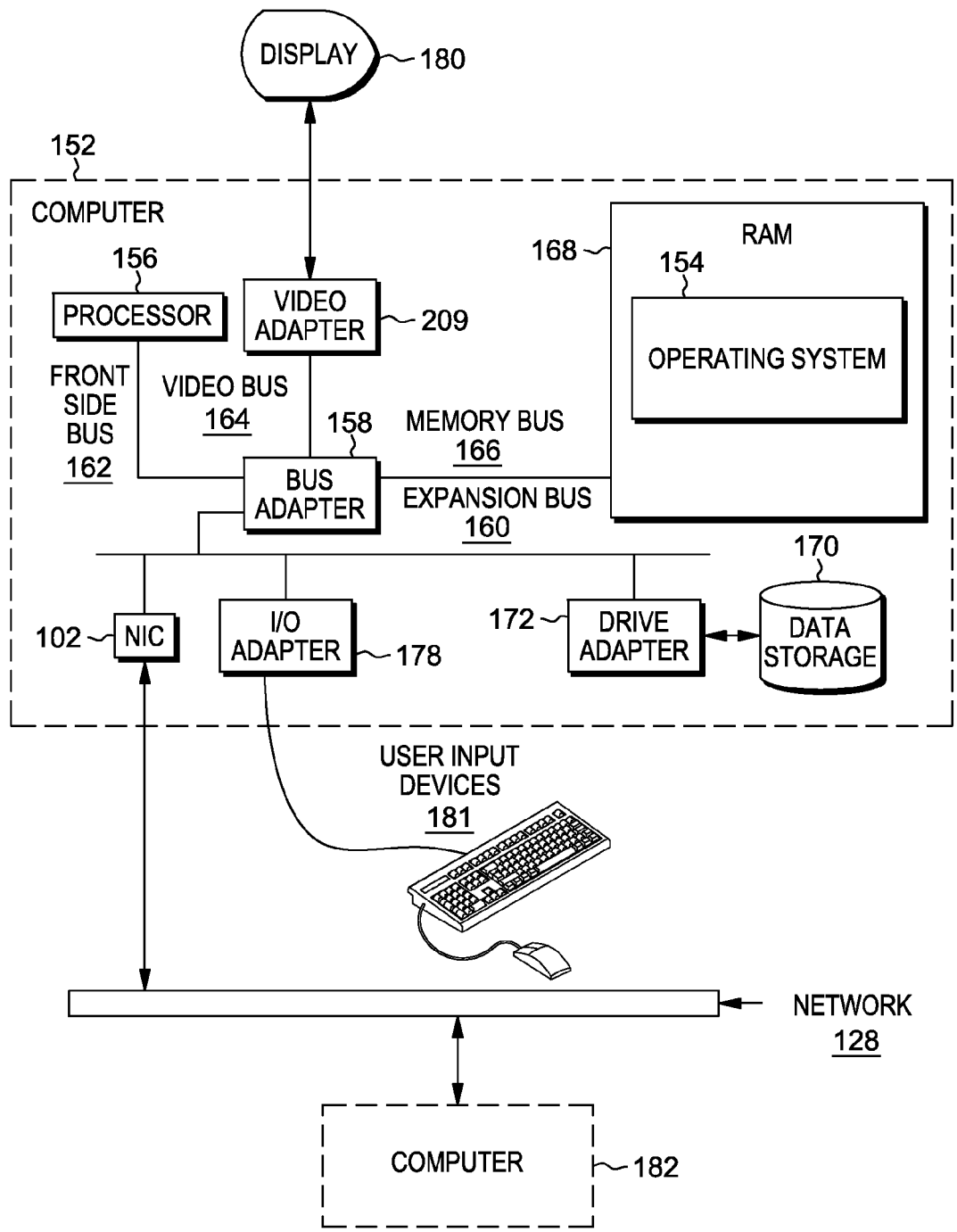
FIG. 8 sets forth a block diagram of automated computing machinery comprising an example computer that may include a dual chipset NIC according to embodiments of the present invention.

FIG. 8 sets forth a block diagram of automated computing machinery comprising an example computer 152 that may include a dual chipset NIC 102 according to embodiments of the present invention. The computer 152 of FIG. 8 includes at least one computer processor 156 or 'CPU' as well as random access memory 168 ('RAM') which is connected through a high speed memory bus 166 and bus adapter 158 to processor 156 and to other components of the computer 152.

Stored in RAM 168 is an operating system 154. Operating systems useful in computers 152 that include a dual chipset NIC 102 according to embodiments of the present invention include UNIX™, Linux™, Microsoft XP™, AIX™, IBM's i5/OS™, and others as will occur to those of skill in the art. The operating system 154 in the example of FIG. 2 is shown in RAM 168, but many components of such software typically are stored in non-volatile memory also, such as, for example, on a disk drive 170.

The computer 152 of FIG. 8 includes disk drive adapter 172 coupled through expansion bus 160 and bus adapter 158 to processor 156 and other components of the computer 152. Disk drive adapter 172 connects non-volatile data storage to the computer 152 in the form of disk drive 170. Disk drive adapters useful in computers 152 that include a dual chipset NIC 102 according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer 152 of FIG. 8 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example computer 152 of FIG. 8 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The example computer 152 of FIG. 8 includes a dual chipset NIC 102 for data communications with other computers 182 and for data communications with a data communications network 128. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of a dual chipset NIC 102 according to embodiments of the present invention include, FibreChannel adapters, Ethernet (IEEE 802.3) adapters for wired data communications network communications, 802.11 adapters for wireless data communications network communications, and so on.

Figure 9:
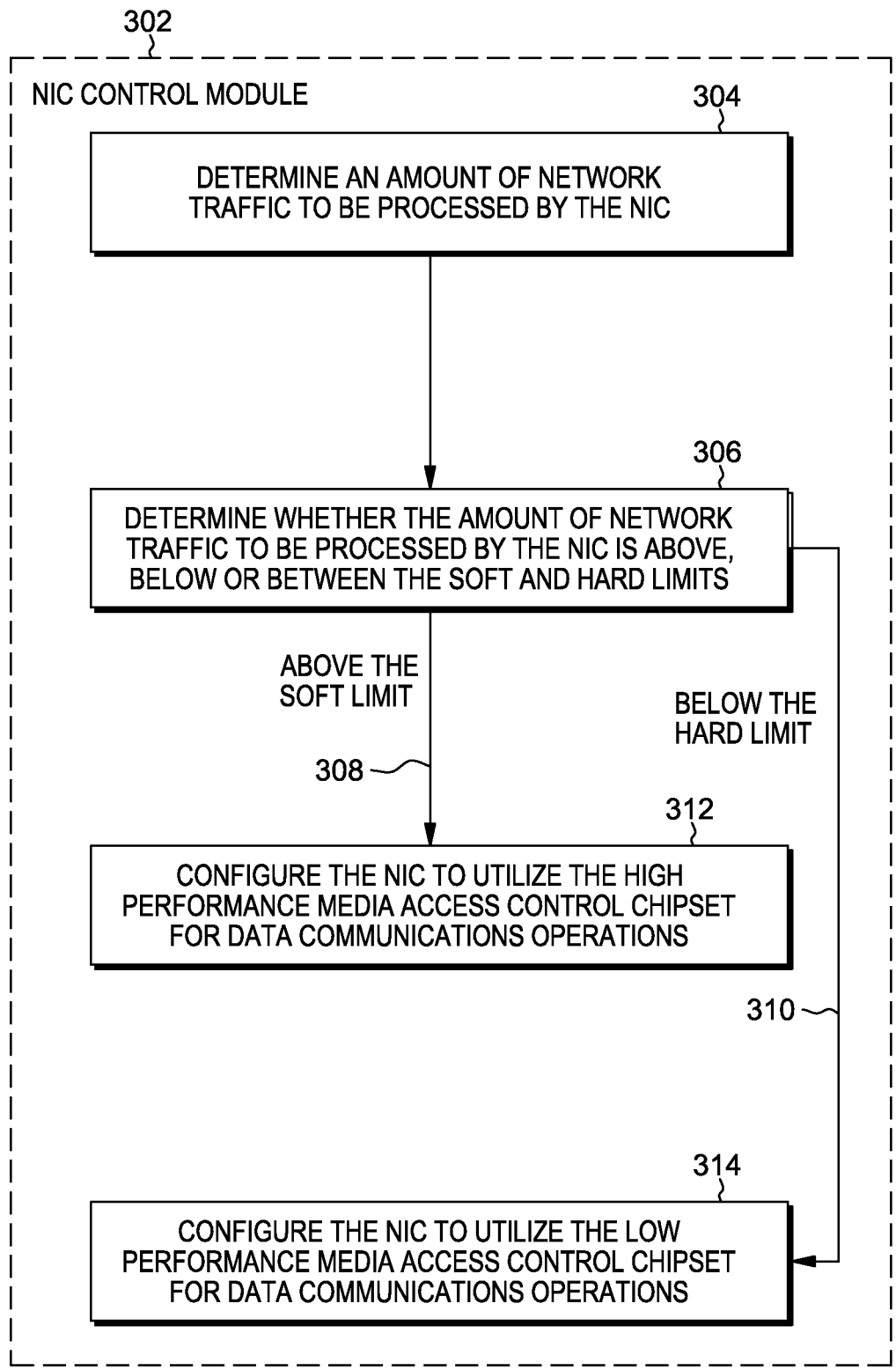
FIG. 9 sets forth a flow chart illustrating an example method for operating a dual chipset NIC that includes a high performance media access control chipset and a low performance media access control chipset according to embodiments of the present invention.

For further explanation, FIG. 9 sets forth a flow chart illustrating an example method for operating a dual chipset NIC that includes a high performance media access control chipset and a low performance media access control chipset according to embodiments of the present invention. In the example method of FIG. 9, the dual chipset NIC that includes a high performance media access control chipset and a low performance media access control chipset may be embodied, for example, as the NIC of FIG. 1.

The example method of FIG. 9 may be carried out by a NIC control module 302. The NIC control module 302 of FIG. 9 may be embodied, for example, as a module of computer program instructions executing on computer hardware such as a computer processor. The NIC control module 302 of FIG. 9 may be stored in computer memory that is included as part of the NIC, such that the NIC itself is responsible for its own operation. For example, the NIC control module 302 of FIG. 9 may be stored in the shared memory 116 depicted in FIG. 1 and may be executed by either processor 114 or 126 depicted in FIG. 1. Alternatively, the NIC control module 302 of FIG. 9 may be executed by a dedicated, special purpose processor of the NIC that is not illustrated in FIG. 1.

The example method of FIG. 9 includes determining 304, by the NIC control module 302, an amount of network traffic to be processed or being processed by the NIC. In the example method of FIG. 9, the amount of network traffic being processed by the NIC may be expressed, for example, in terms of the number of bytes processed by the NIC over a particular unit of time. The amount of network traffic being processed by the NIC can include the number of bytes of data received by the NIC, the number of bytes of data transferred by the NIC, or any combination thereof. In such a way, the amount network traffic being processed by the NIC can represent the total amount of data flowing through the NIC over a particular period of time. In the example method of FIG. 9, determining 304 an amount of network traffic being processed by the NIC may be carried out, for example, by monitoring the amount of data flowing out of an egress port of the NIC over a predetermined period of time, by monitoring the amount of data flowing into an ingress port of the NIC over a predetermined period of time, or any combination thereof.

The example method of FIG. 9 also includes determining 306, by the NIC control module 302, whether the amount of network traffic to be processed or being processed by the NIC is below the above-mentioned hard limit, above the soft limit, or between these two limits. As discussed above, these limits represent points, or traffic volumes, at which the media access control chipset that is best equipped to handle the amount of network traffic that is being processed by the NIC may change. For example, when the amount of network traffic that is to be processed by the NIC is lower than the hard limit, data communications operations should be carried out using the low performance media access control chipset. Alternatively, when the amount of network traffic that is to be processed by the NIC is greater than the soft limit, data communications operations should be carried out using the high performance media access control chipset.

The example method of FIG. 9 also includes configuring 312 the NIC to utilize the high performance media access control chipset for data communications operations. In the example method of FIG. 9, configuring 312 the NIC to utilize the high performance media access control chipset for data communications operations may be carried out in response to affirmatively 308 determining that the amount of network traffic to be processed by the NIC exceeds the soft limit. Configuring 312 the NIC to utilize the high performance media access control chipset for data communications operations may be carried out, for example, through the use of an active flag maintained by each media access control chipset. When the value of the active flag maintained by a particular media access control chipset is set to '1', the media access control chipset may operate as normal— sending packets and processing received packets. When the value of the active flag maintained by a particular media access control chipset is set to '0', however, the media access control chipset may operate in a standby mode and may be configured to refrain from processing received packets, transmitting packets, or performing any other operations in an attempt to facilitate data communications. In such an example, configuring 312 the NIC to utilize the high performance media access control chipset for data communications operations may be carried out by setting the active flag for the high performance media access control chipset to a value of '1' and also setting the active flag for the low performance media access control chipset to a value of '0'.

The example method of FIG. 9 also includes configuring 314 the NIC to utilize the low performance media access control chipset for data communications operations. In the example method of FIG. 9, configuring 314 the NIC to utilize the low performance media access control chipset for data communications operations may be carried out in response to determining that the amount of network traffic to be processed by the NIC does not 310 exceed the hard limit. Configuring (314) the NIC to utilize the low performance media access control chipset for data communications operations may be carried out, for example, through the use of an active flag maintained by each media access control chipset. When the value of the active flag maintained by a particular media access control chipset is set to '1', the media access control chipset may operate as normal— sending packets and processing received packets. When the value of the active flag maintained by a particular media access control chipset is set to '0', however, the media access control chipset may operate in a standby mode and may be configured to refrain from processing received packets, transmitting packets, or performing any other operations in an attempt to facilitate data communications. In such an example, configuring (314) the NIC to utilize the low performance media access control chipset for data communications operations may be carried out by setting the active flag for the low performance media access control chipset to a value of '1' and also setting the active flag for the high performance media access control chipset to a value of '0'.

Additional details of NIC 102 are disclosed in copending application Ser. No. 14/096,270, the entire contents and disclosure of which are hereby incorporated herein by reference.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operating a scheduler for a dual chipset hardware architecture comprising, a high performance hardware processor unit having a first operating speed, and a low performance hardware processor unit having a second operating speed slower than the first operating speed, the method comprising:
   analyzing incoming data traffic flow to the dual chipset, and monitoring the incoming data traffic flow for an indication of an expected data traffic flow to the dual chipset; and
   selectively enabling only one of the high and low performance processor units at first times to process the expected data flow, and enabling both of the high and low performance processor units at second times to process the expected data traffic flow, based on said expected data flow, ahead of said expected data flow reaching the dual chipset; wherein:
   the analyzing incoming data traffic flow to the dual chipset, and monitoring the incoming data traffic flow for an indication of an expected traffic flow includes
   analyzing the incoming data traffic flow to identify a defined window size for each segment of the analyzed incoming traffic,
   summing all the window sizes identified over a predetermined time period to obtain a window size sum,
   determining whether the window size sum meets a first threshold value representative of a high traffic volume,
   determining whether the window size sum does not meet a second threshold value, less than the first threshold value, representative of a low traffic volume, and
   determining whether the window size sum is between the first and second threshold values representative of an intermediate traffic volume; and
   wherein the selectively enabling includes:
   responsive to the determination the window size sum meeting the first threshold, enabling a first set of processors, including the first processor, to process said high traffic volume;
   determining whether the window size sum does not meet a second threshold value, less than the first threshold value, representative of a low traffic volume;
   responsive to the determination the window size sum does not meet the second threshold value, enabling a second set of processors, including the second processor, to process said low traffic volume;
   determining whether the window size sum is between the first and second threshold values representative of an intermediate traffic volume;
   responsive to the determination the window size sum is between the first and second threshold values, enabling the first and second sets of processors to process said intermediate traffic volume, and starting a timer for a predetermined time period, said second set of processors being enabled in an overclock mode; and
   responsive to determining, when of the predetermined time period expires, the window size sum is above the second threshold value, disabling the overclock mode of the second set of processors.

2. The method according to claim 1, the monitoring the incoming data traffic flow for an indication of an expected data traffic flow to the dual chipset includes using the window size sum to determine the expected data traffic flow.

3. The method according to claim 2, wherein the expected data traffic flow includes a plurality of data flows through a specified connection, and a respective one data flow indicator value is associated with each of the plurality of data flows, each of the data indicator values indicating an expected volume of data in the associated data flow.

4. The method according to claim 1, wherein the selectively enabling includes:

enabling the high performance processor when the expected data traffic flow is above the first threshold;

enabling the low performance processor when the expected data traffic flow is below the second threshold;

enabling the high performance processor and the low performance processor when the expected data flow is between the first and second thresholds; and disabling the low performance processor when the expected data flow remains between the first and second thresholds for a predetermined length of time.

\* \* \* \* \*